Aug. 22, 1961　　　　　　H. HESKY　　　　　　2,997,369
PROCESS FOR ENRICHING AND/OR PRODUCING HEAVY WATER DURING
THE SYNTHESIS OF AMMONIA USING EXCHANGE OF ISOTOPES
BETWEEN AMMONIA AND HYDROGEN GAS
Filed Aug. 13, 1957
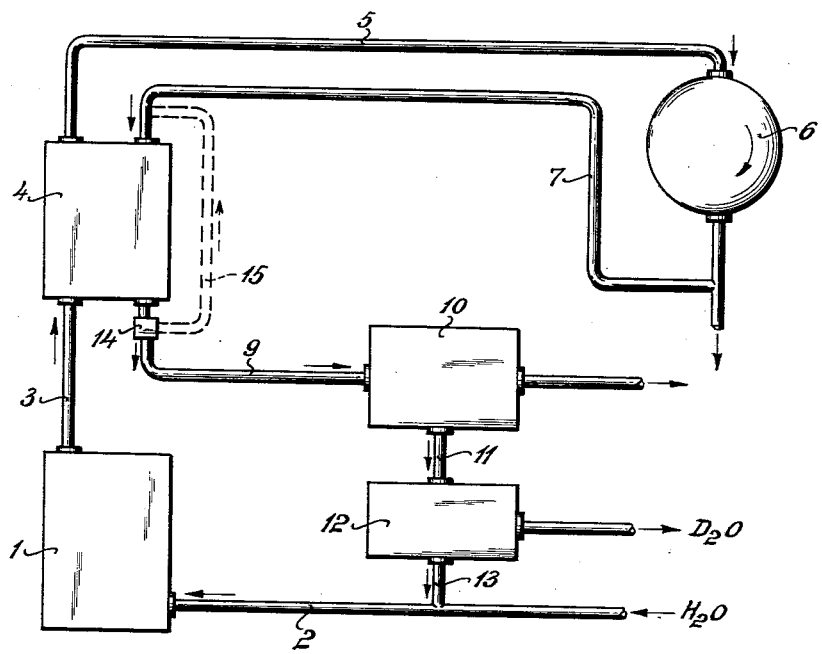
INVENTOR
Hans Hesky
by
Reboben W. Fraser
attorney United States Patent Office 2,997,369
Patented Aug. 22, 1961

2,997,369
PROCESS FOR ENRICHING AND/OR PRODUCING HEAVY WATER DURING THE SYNTHESIS OF AMMONIA USING EXCHANGE OF ISOTOPES BETWEEN AMMONIA AND HYDROGEN GAS
Hans Hesky, 15 Freedenstrasse, Dortmund, Germany
Filed Aug. 13, 1957, Ser. No. 677,931
Claims priority, application Germany Aug. 17, 1956
8 Claims. (Cl. 23—204)

This invention relates to a process for enriching and/or producing heavy water during the synthesis of ammonia using exchange of isotopes between ammonia and hydrogen gas. For enriching and/or producing heavy water during the synthesis of ammonia, a number of processes are known in which the hydrogen gas required for the ammonia synthesis is brought into isotope exchange with water on its way to the synthesis apparatus and the water is continuously enriched in this way with deuterium.

In this method the equilibrium constant in the isotope exchanger is relatively low and the synthesis gas introduced into the synthesis apparatus still entrains a considerable part of the deuterium.

It is also known that exchange of isotopes is possible between hydrogen gas and gaseous ammonia.

The present invention makes use of this kind of isotope exchange and contemplates bringing the starting hydrogen into isotope exchange with a part of the ammonia produced therefrom and working up the ammonia enriched in this way with deuterium into water, for example burning it catalytically to give nitric oxide and water.

It is also possible to enrich the ammonia enriched with deuterium further on its way through hot and cold exchange columns, using hydrogen as companion gas, and, by combustion thereof to give nitric oxide and water or by exchange of isotopes between ammonia and water, to transfer the deuterium to water and obtain it in this way.

By means of this process, on the one hand, the rather high difference of concentration between the two phases used for the exchange of isotopes is utilized and a substantially higher yield of water enriched with deuterium is thereby obtained than in the case of the known processes.

On the other hand, the disadvantage resulting from the considerable nitrogen sensitivity of the known installations, in which the ammonia forming when nitrogen is present damages and blocks the catalyst, is obviated since the process according to the invention is in itself insensitive to nitrogen owing to the mainner in which it proceeds.

Owing to the fact that the ammonia obtained in the synthesis apparatus is produced from the hydrogen drawn off at the head of the isotope exchange column, the deuterium concentration of the ammonia necessarily corresponds to the deuterium concentration of the said hydrogen, so that in this case the ammonia synthesis apparatus exerts a similar effect to that of the reflux condenser in rectifying columns. Thus, a quantitative washing out of deuterium can be obtained in the isotope exchange column, so that the ammonia produced in the synthesis apparatus is practically free from deuterium.

The water enriched with deuterium which is obtained on the catalytic combustion of the ammonia enriched with deuterium to give nitric oxide and water is advantageously fed to a high-concentration stage. The water obtained therein, which has become poor in deuterium, may be conveyed back to the apparatus for generating the starting hydrogen, if the said water is still richer in deuterium than natural water. By employing exchange of isotopes between ammonia and starting hydrogen, the equilibrium constant in the isotope exchanger is substantially higher than it is in the installations heretofore known, which operate using isotope exchange between hydrogen gas and natural water. In this way, higher differences of concentration result between the two phases and the advantages associated therewith are secured.

A further advantage of the process according to the invention is that the ammonia in the isotope exchange column exerts a purifying action on any substances present in the synthesis gas which may be harmful to the synthesis contact (catalyst poisons, such as, for example, $H_2O$), so that, in contrast to operation as performed heretofore, the synthesis gas can be fed into the synthesis circuit in front of the ammonia furnace.

In the process according to the invention, it is possible to operate with a low concentration of the starting gas in front of the isotope exchanger and a high concentration of the concentrate fed to the combustion furnace is obtained, it being possible to obtain in practice a material yield of approximately 100 percent.

The exchange of isotopes between ammonia and hydrogen may take place in the gaseous phase. Particularly advantageous, however, is the exchange of isotopes between liquid ammonia and hydrogen gas in a contact or catalyst bed or by means of a contact substance or catalyst suspended in the liquid, for example potassium amide. If, when using a catalyst suspension, a filter or the like is inserted in the outlet for the ammonia enriched with deuterium from the isotope exchanger, it is possible to circulate the contact substance continuously in the isotope exchanger practically without any loss.

The accompanying drawing is a diagram of an installation for carrying out the process according to the invention.

In the drawing the reference numeral 1 represents any desired apparatus for generating hydrogen, to which apparatus water is supplied through the pipe 2.

The apparatus 1 is, for example, an electrolyzer, a water gas generator plant and/or a CO conversion apparatus or a decomposing apparatus for hydrocarbons, it also being possible for the initial product to contain free hydrogen.

The hydrogen gas coming from the apparatus 1 passes by way of the pipe 3 into the isotope exchanger 4 and thence, completely deprived of deuterium, by way of the pipe 5 into the synthesis apparatus 6. Part of the ammonia produced in the synthesis apparatus is conveyed back through the pipe 7 into the isotope exchanger and is enriched therein with deuterium. The ammonia enriched in this way passes by way of the pipe 9 into a combustion chamber 10 where it is burned to give nitric oxide and water enriched with deuterium. The enriched water flows through the pipe 11, for example, into a high-concentration apparatus 12, the impoverished water being advantageously fed back into the pipe 2 through the pipe 13, if it is still richer in deuterium than natural water.

Of course, it is possible to dispense with the high-concentration apparatus and to remove the water enriched with deuterium directly from the pipe 11. In certain circumstances the return of the impoverished water to the pipe 2 by way of the pipe 13 can also be eliminated.

When a contact substance circulating with the liquid ammonia is employed, a separating device 14 for the contact substance can be provided at the ammonia outlet of the isotope exchange column, the contact substance being returned at the head of the isotope exchange column to the pipe 7 through the pipe 15.

*Example*

Heavy water is to produced by the process according to the invention in a nitrogen plant which is designed for an output of 48,000 tons of nitrogen per annum.

25% of the ammonia is branched off from the ammonia synthesis apparatus and is fed to the isotope exchange column, which operates at a temperature of 25° C. The ammonia can be freed beforehand by distillation methods from the water contained therein, the heat of evaporation of the ammonia being used for refrigerating purposes, for example for cooling nitric acid or for cooling the ammonia during its removal from the ammonia synthesis apparatus. The contact substance, for example potassium amide, is added to the ammonia purified in this way and this mixture is introduced into the isotope exchange column. In such exchange column the ammonia extracts the deuterium from the hydrogen of the synthesis gas and becomes enriched down to the bottom of the isotope exchanger to 9.6 times, referred to the natural deuterium concentration of the hydrogen of 0.0143. After the ammonia leaves the isotope exchanger, the potassium amide is separated from the ammonia by distillation methods and is again added to the ammonia entering the column. Owing to the fact that the contact substance still contains 100% of moisture, the deuterium concentration of the mixture is increased from 0.36 to 0.801 of the natural concentration at the head of the isotope exchanger.

The ammonia freed from the catalyst is burnt catalytically in the usual way to give nitrogen monoxide. The water of reaction is separated in a condenser and fed to the high-concentration apparatus which is constructed as a hot-and-cold system. In the present case, 20% of the quantity of deuterium contained in the water of reaction is recovered. The water leaving the high-concentration apparatus and which has again become poor in deuterium is added to the fresh water supplied to the hydrogen-generating apparatus. The total yield of the installation is 64%.

The quantity of fresh water supplied to the hydrogen-generating apparatus is 7940 kg./h. and the quantity of heavy water produced is 7.0 tons per annum.

I claim:

1. A process of producing water of enriched deuterium content comprising the steps of contacting ammonia substantially free of deuterium with a gas comprising hydrogen and deuterium in an isotope exchange zone, removing hydrogen substantially free of deuterium from said exchange zone and reacting it with nitrogen to produce ammonia substantially free of deuterium, recycling a portion of said ammonia product to said exchange zone and removing deuterium enriched ammonia from said exchange zone and converting it into deuterium enriched water and nitrogen oxide.

2. The process of claim 1 wherein said deuterium enriched ammonia is burned catalytically to produce deuterium enriched water and nitrogen oxide.

3. A process of producing water of enriched deuterium content included in combination with a conventional ammonia synthesis process comprising the steps of generating a gas comprising hydrogen and deuterium from water, contacting ammonia substantially free of deuterium with said generated gas in an isotope exchange zone, removing hydrogen substantially free of deuterium from said exchange zone and reacting it with nitrogen to produce ammonia substantially free of deuterium, recycling a portion of said ammonia product to said exchange zone, removing deuterium enriched ammonia from said exchange zone and converting it into deuterium enriched water and nitrogen oxide, and concentrating said deuterium enriched water to obtain water further enriched in deuterium and water relatively depleted in deuterium.

4. The process of claim 3 wherein a portion of said deuterium depleted water is recycled to said gas generating step.

5. The process of claim 3 wherein said isotope exchange step takes place in the gaseous phase.

6. A process of producing water of enriched deuterium content comprising the steps of maintaining liquid ammonia in an isotope exchange column containing an equilibrium exchange catalyst, feeding ammonia substantially free of deuterium into said column, feeding a gas comprising hydrogen and deuterium into contact with said catalyst and ammonia in said column, removing hydrogen substantially free of deuterium from said column and reacting it with nitrogen to produce ammonia substantially free of deuterium, recycling a portion of said ammonia product to said column, and removing deuterium enriched ammonia from said column and converting it into deuterium enriched water and nitrogen oxide.

7. The process of claim 6 wherein said catalyst is present in said column as a catalyst bed.

8. The process of claim 6 wherein said catalyst is suspended in said liquid ammonia and is filtered from said deuterium enriched ammonia during the removal thereof from said column, and said filtered catalyst is recycled to said column.

References Cited in the file of this patent

UNITED STATES PATENTS

| 2,690,379 | Urey et al. | Sept. 28, 1954 |
| 2,787,526 | Spevack | Apr. 2, 1957 |

FOREIGN PATENTS

| 1,138,776 | France | Feb. 4, 1957 |

OTHER REFERENCES

Stephenson: "Introduction to Nuclear Engineering," 1954, pages 309–311.

Selak et al.: "Chemical Engineering Progress," vol. 50, No. 5, pages 227–228 (May 1954).

Benedict: Peaceful Uses of Atomic Energy, vol. 8, p. 403, United Nations, New York, 1956.